United States Patent
Maeda et al.

(10) Patent No.: US 8,375,794 B2
(45) Date of Patent: Feb. 19, 2013

(54) OPERATION-POSITION DETECTOR AND APPLICATION THEREOF

(75) Inventors: Yuki Maeda, Yokohama (JP); Kazuyoshi Nakaya, Yokohama (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 138 days.

(21) Appl. No.: 12/776,659

(22) Filed: May 10, 2010

(65) Prior Publication Data
US 2010/0212428 A1   Aug. 26, 2010

Related U.S. Application Data

(63) Continuation of application No. PCT/JP2008/070079, filed on May 11, 2008.

(30) Foreign Application Priority Data

Nov. 12, 2007 (JP) ................................. 2007-293313

(51) Int. Cl.
*G01N 29/07* (2006.01)
(52) U.S. Cl. .......................................................... 73/597
(58) Field of Classification Search ...................... 73/597
See application file for complete search history.

(56) References Cited

U.S. PATENT DOCUMENTS

2004/0099058 A1* 5/2004 Edvardsson ................. 73/290 V
2004/0173021 A1* 9/2004 Lizon et al. ................. 73/290 V

FOREIGN PATENT DOCUMENTS

| JP | 8-313499 | 11/1996 |
| JP | 10096769 | 4/1998 |
| JP | 2002-227908 | 8/2002 |
| JP | 2006-252056 | 9/2006 |

OTHER PUBLICATIONS

PCT/JP2008/070079 Written Opinion dated Nov. 21, 2008.
PCT/JP2008/070079 Search Report dated Nov. 21, 2008.

* cited by examiner

*Primary Examiner* — Hezron E Williams
*Assistant Examiner* — Gregory J Redmann
(74) *Attorney, Agent, or Firm* — Dickstein Shapiro LLP

(57) ABSTRACT

An operation-position detector having a tube that allows an ultrasonic signal to propagate therethrough. The tube has a plurality of holes capable of being selectively closed or opened by an operation and is provided with an ultrasonic transmitter-receiver arranged at a first end thereof. A signal processor drives the ultrasonic transmitter-receiver and causes an ultrasonic signal to propagate through the inside of the tube, receives a reflection signal corresponding to a closed or open state of each of the holes, and detects the state of each hole on the basis of the reflection signal, thereby detecting the operation position of an operation conducted by an operator.

12 Claims, 16 Drawing Sheets

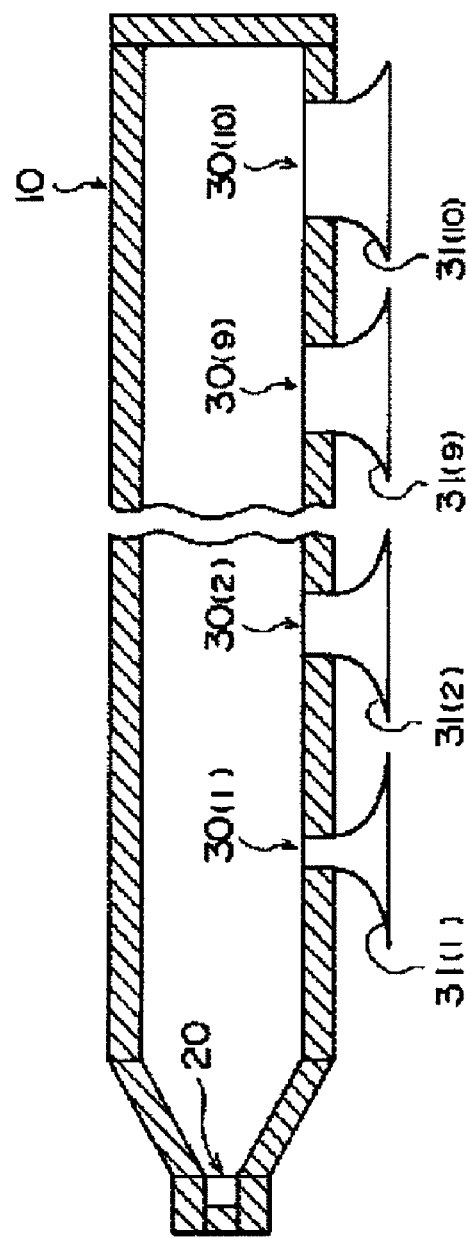

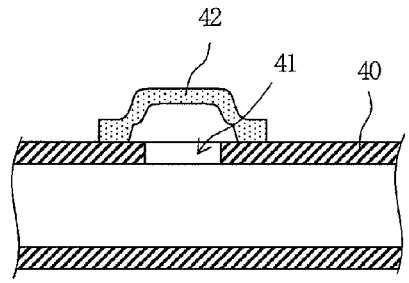
FIG. 5(A)
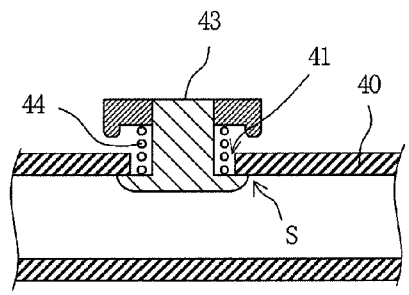
FIG. 5(B)
FIG. 6
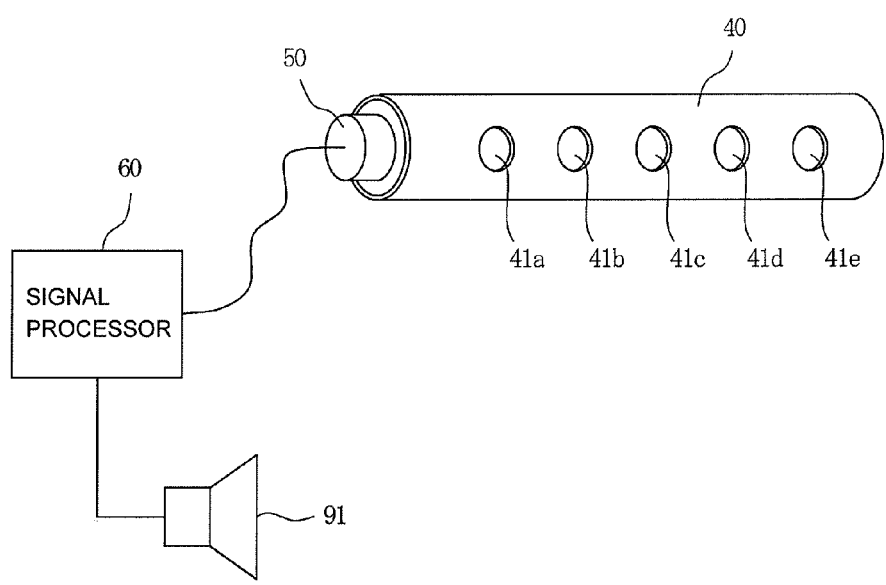

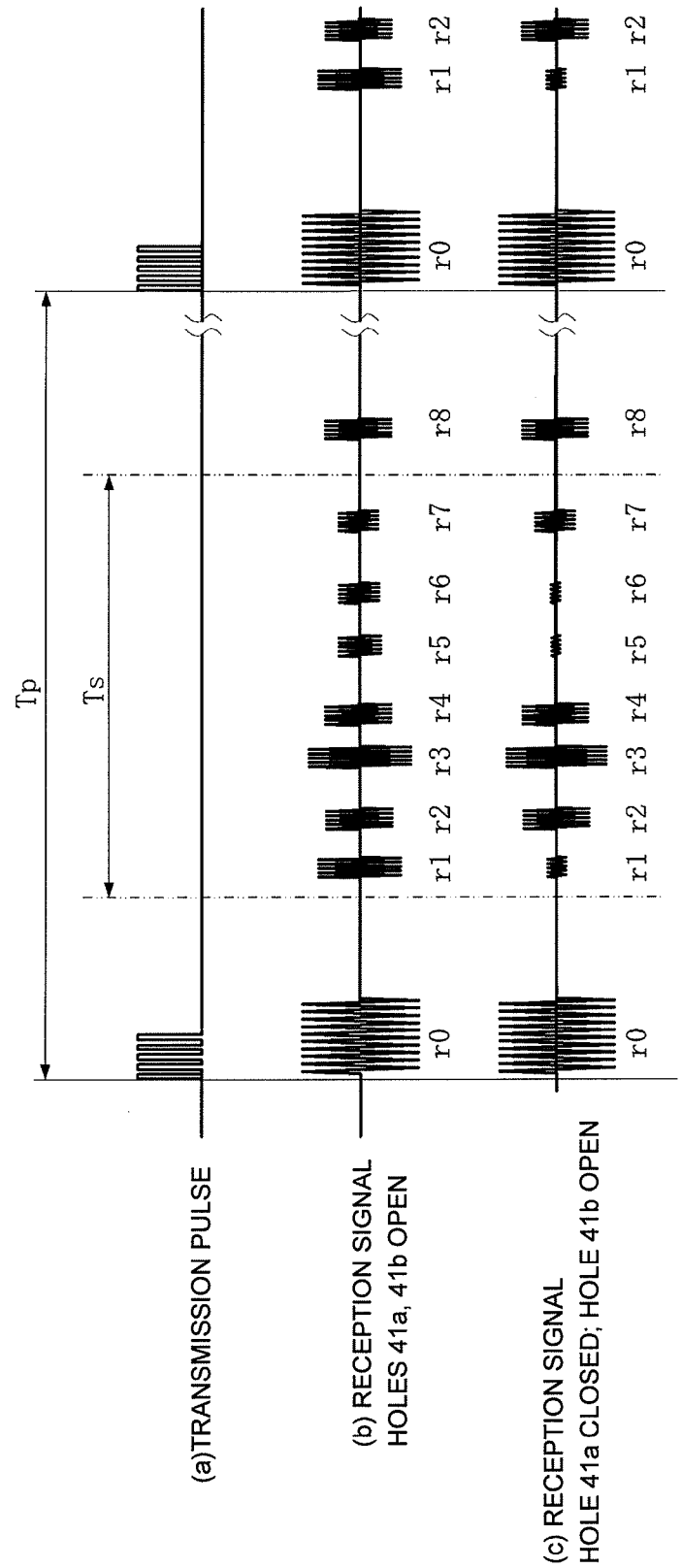

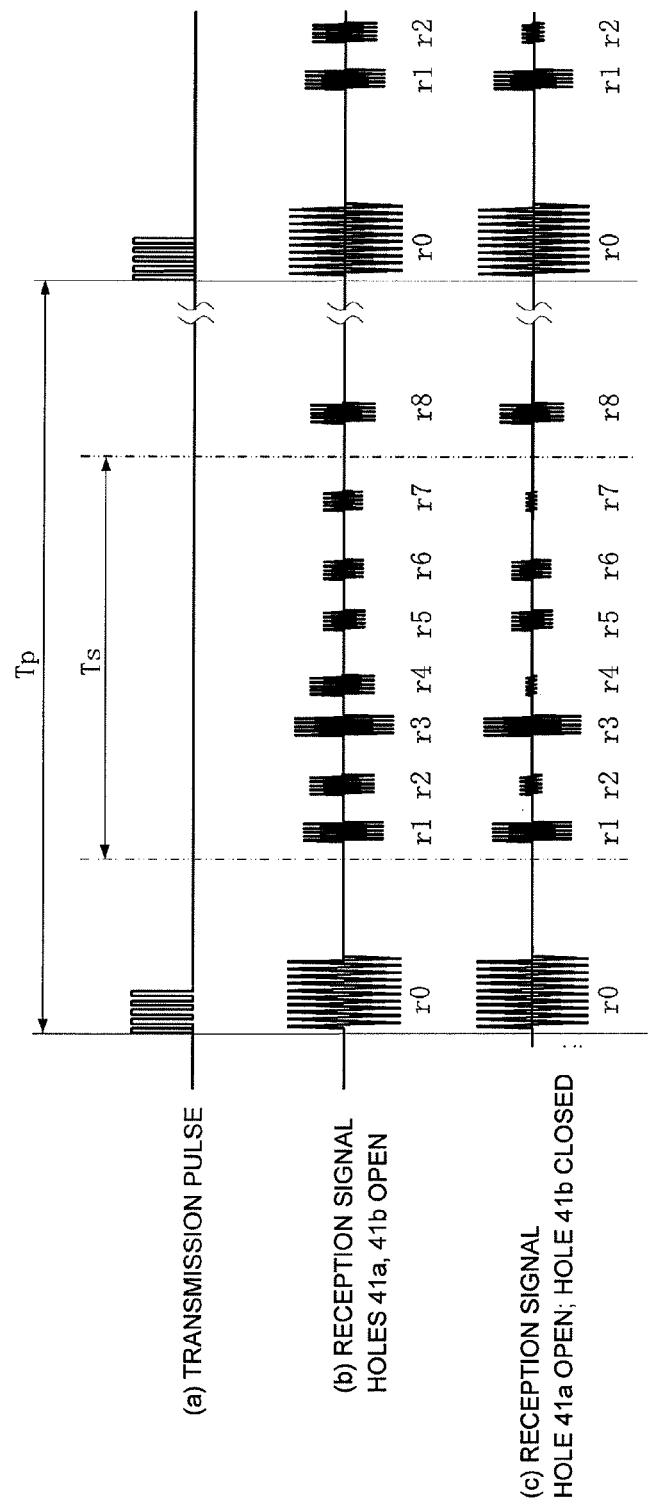

OPERATION-POSITION DETECTOR AND APPLICATION THEREOF

CROSS REFERENCE TO RELATED APPLICATIONS

The present application is a continuation of International Application No. PCT/JP2008/070079, filed Nov. 5, 2008, which claims priority to Japanese Patent Application No. JP2007-293313, filed Nov. 12, 2007, the entire contents of each of these applications being incorporated herein by reference in their entirety.

FIELD OF THE INVENTION

The present invention relates to an operation-position detector for detecting an operation position through transmission and reception of an ultrasonic signal and an application that uses the same.

BACKGROUND OF THE INVENTION

A thing that detects the position of an object through transmission and reception of an ultrasonic signal is basically one that measures the distance on the basis of a time lag between transmission of an ultrasonic signal and reception of a reflected wave from an object. In particular, an object detecting device using a transmission tube for allowing an ultrasonic wave to pass therethrough is illustrated in Patent Document 1.

FIG. 1 is a cross-sectional view of an ultrasonic transmitting and receiving unit of a device for detecting an object on a road illustrated in Patent Document 1. The ultrasonic transmitting and receiving unit includes a cylindrical transmitting tube 10, and an ultrasonic generator 20 is fixed at a first end of the transmitting tube 10, and a second end of the transmitting tube 10 is closed. An ultrasonic wave emitted from the generator 20 propagates through the inside of the transmitting tube 10 and is emitted to the outside through openings 30(1) to 30(10) and horns 31(1) to 31(10). A reflected wave from an object re-enters the transmitting tube 10, propagates therethrough, and returns to the generator 20.

In such a way, a circuit connected to the generator 20 determines the distance to the object on the basis of a time lag from the transmission of the above ultrasonic signal to the reception.

[Patent Document 1] Japanese Unexamined Patent Application Publication No. 10-96769

SUMMARY OF THE INVENTION

The present invention does not aim to measure the distance to an object, but aims to detect the operation position of an operation conducted by an operator with, for example, a finger without the use of an electric switch. The ultrasonic transmitting and receiving unit illustrated in Patent Document 1 cannot read the operation position of an operation of an operator.

It is an object of the present invention to provide an operation-position detecting device that detects the operation position of an operation of an operator using a tube that allows an ultrasonic signal to propagate therethrough.

An operation-position detector of the present invention includes at least one tube having a plurality of holes disposed at a side, the plurality of holes capable of being selectively closed or opened by an operation of an operator, an ultrasonic transducer arranged at an end of the tube, and ultrasonic-signal processing means for driving the ultrasonic transducer and transmitting an ultrasonic wave, receiving an ultrasonic reflection signal that propagates through the inside of the tube and is reflected in the inside of the tube and obtaining a reception signal, and detecting a position of a hole that undergoes the operation on the basis of the reception signal.

With this configuration, the density of a gas inside the tube is discontinuous at an open hole portion, mismatching in acoustic feature impedance in a transmission line produces reflection of an ultrasonic signal, and the position of a hole that causes the reflection can be detected by the use of a time lag between transmission of the ultrasonic signal from the ultrasonic transmitter-receiver and reception of the reflected wave. Because the plurality of holes are disposed so as to be able to be selectively closed or opened by an operation of an operator, the operation position of the operation of the operator can be detected without discharge of an ultrasonic signal to the outside.

For example, the at least one tube may include a plurality of tubes arranged side by side, the ultrasonic transducer may be arranged in each of the plurality of tubes, and the ultrasonic-signal processing means may transmit and receive the ultrasonic signal by the use of the ultrasonic transducers and detect the position of the hole that undergoes the operation in each tube.

With this configuration, the plurality of holes can be arranged lengthwise and crosswise, and the operation-position detector that detects an operation position on a two-dimensional plane can be configured.

The tube may be formed in a U-shape or zigzag, and the holes may be arranged lengthwise and crosswise.

With this, the operation-position detector can be configured with a small size and a low cost using a single ultrasonic transmitter-receiver.

The tube may be formed helically or spirally, and the holes may be arranged within a range extending a flat plane or a curved plane.

With this, the holes can be variously distributed, and the operation position of an operation of an operator can be detected.

Each of the holes may be provided with a cover capable of changing an inside diameter of the tube at the position of the hole with respect to an inside diameter of the tube at a position other than the position at which the hole is formed.

With this, dust can be prevented from entering the inside of the tube through a hole, and entry of outside airflow can also be prevented, so stability of detection of an operation position can be enhanced.

An operation-position detector application of the present invention includes the above-described operation-position detector and means for, in accordance with the detected position of the hole, generating a sound of a scale associated with the hole.

With this, it can be used as an electronic instrument that generates a sound of a scale corresponding to an operation of an operator.

An operation-position detector application of the present invention includes the above operation-position detector and means for, in accordance with the detected position of the hole, generating a key code associated with the hole.

With this, it can be utilized as a keyboard for use in inputting a character, symbol, and the like.

An operation-position detector application of the present invention includes the above operation-position detector and means for, in accordance with the detected position of the hole, producing representation output that indicates correctness or incorrectness associated with the hole.

With this configuration, it can be utilized as an electronic toy, such as a game that can be played for points through an operation of an operator, for example, answering an addressed question.

With the present invention, the density of a gas inside the tube is discontinuous at an open hole portion, mismatching in acoustic feature impedance in a transmission line produces reflection of an ultrasonic signal, and the position of a hole that causes the reflection can be detected by the use of a time lag between transmission of the ultrasonic signal from the ultrasonic transmitter-receiver and reception of the reflected wave. Because the plurality of holes are disposed so as to be able to be selectively closed or opened by an operation of an operator, the operation position of the operation of the operator can be detected without discharge of an ultrasonic signal to the outside.

BRIEF DESCRIPTION OF THE DRAWINGS

FIG. 1 illustrates a configuration of an object detecting device illustrated in Patent Document 1.

FIGS. 5(A) and 5(B) illustrate configurations of a hole portion of an operation-position detector according to a second embodiment.

FIG. 6 illustrates a configuration of an operation-position detector and an electronic instrument being an application thereof according to a third embodiment.

FIG. 16 illustrates a relationship between action of an operation-position detecting section 170 illustrated in FIG. 13 and timing of processing.

FIG. 17 illustrates another relationship between action of the operation-position detecting section 170 illustrated in FIG. 13 and timing of processing.

Figure 2A:
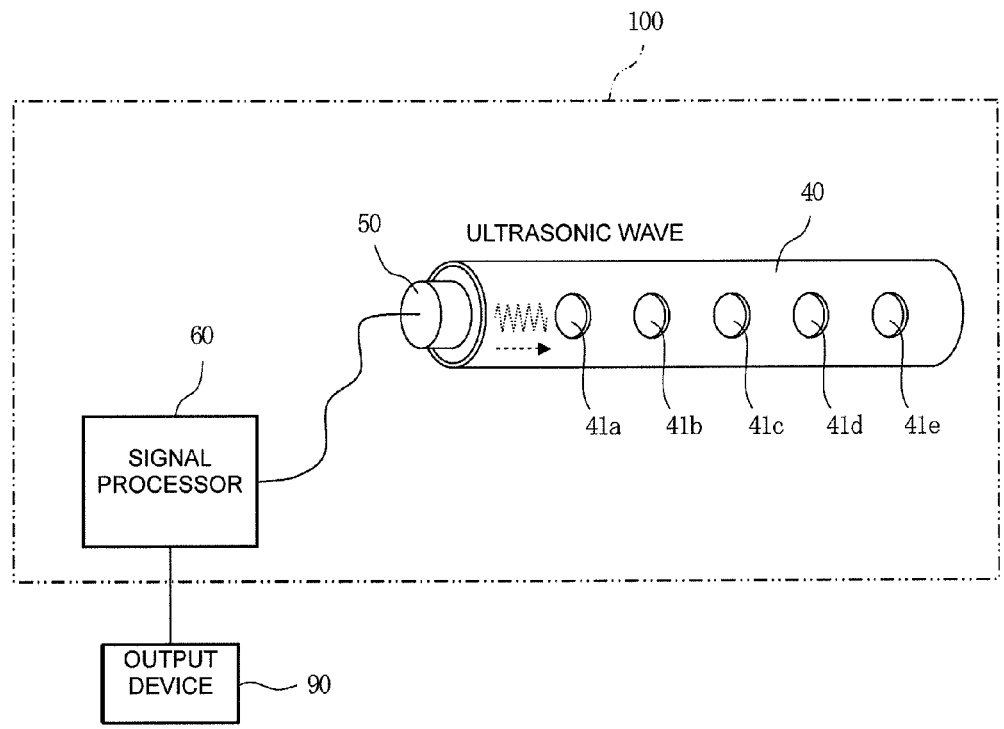
FIG. 2(A) illustrates a configuration of an operation-position detector and FIG. 2(B) illustrates an application thereof according to a first embodiment.

REFERENCE NUMERALS 40, 140 tube
41 hole
42 cover
43 opening and closing member
44 coil spring
45 insertion bar
50 ultrasonic transmitter-receiver
60, 61 signal processor
Reference Numerals
70, 170 operation-position detecting section
80 output controller
90, 93 output device
91 speaker
92 personal computer
94 display section
95 buzzer
96 representation member
100 operation-position detector
rl-r8 route

DETAILED DESCRIPTION OF THE INVENTION

First Embodiment

Figure 2B:
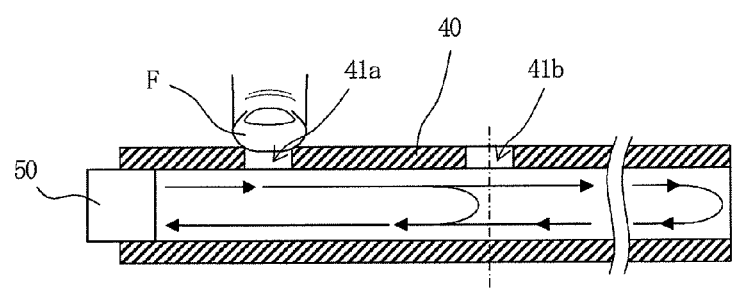

FIGS. 2(A) and 2(B) illustrate a configuration of an operation-position detector and an application thereof according to a first embodiment. In FIG. 2(A), an operation-position detector 100 includes a tube 40 having a plurality of holes 41a to 41e at its side and an ultrasonic transmitter-receiver 50 arranged in an end of the tube 40. The ultrasonic transmitter-receiver 50 corresponds to an ultrasonic transducer according to the present invention. The ultrasonic transmitter-receiver 50 is connected to a signal processor 60. In such a way, the tube 40, which has the plurality of holes and is provided with the ultrasonic transmitter-receiver 50 at its end, and the signal processor 60 form the operation-position detector 100.

The signal processor 60 detects an open or closed state of each of the holes 41a to 41e of the tube 40 and outputs a signal corresponding to the detection to an output device 90. The output device 90 performs specific outputting depending on a purpose for using the operation-position detector 100. The output device 90 and the operation-position detector 100 form an operation-position detector application.

FIG. 2(B) is a cross-sectional view that illustrates a configuration of the tube 40 shown in FIG. 2(A). The tube 40 is a tube having the holes 41a, 41b, . . . , disposed along its longitudinal direction and having a length of approximately 500 mm. When the tube 40 is used without being bent, a rigid tube, for example, an acrylic resin pipe, is used.

For both ends of the tube 40, a first opening is closed by the attachment of the ultrasonic transmitter-receiver 50 thereto, whereas a second opening is an open end as it is.

Here, a state in which an operator closes the hole 41a with a finger F is discussed. An ultrasonic signal transmitted from the ultrasonic transmitter-receiver 50 propagates in the vicinity of the hole 41a and is reflected in the vicinity of the hole 41b being open. It is also reflected in the vicinity of the other holes being open and also reflected at the open end of the tube 40, and a reflected signal thereof returns to the ultrasonic transmitter-receiver 50.

The above reflection results from a discontinuous change in acoustic feature impedance inside the tube occurring in the hole 41 portion being open.

Even if the terminal of the tube 40 is not opened but is closed, reflection occurs at that short-circuited end.

Figure 3:
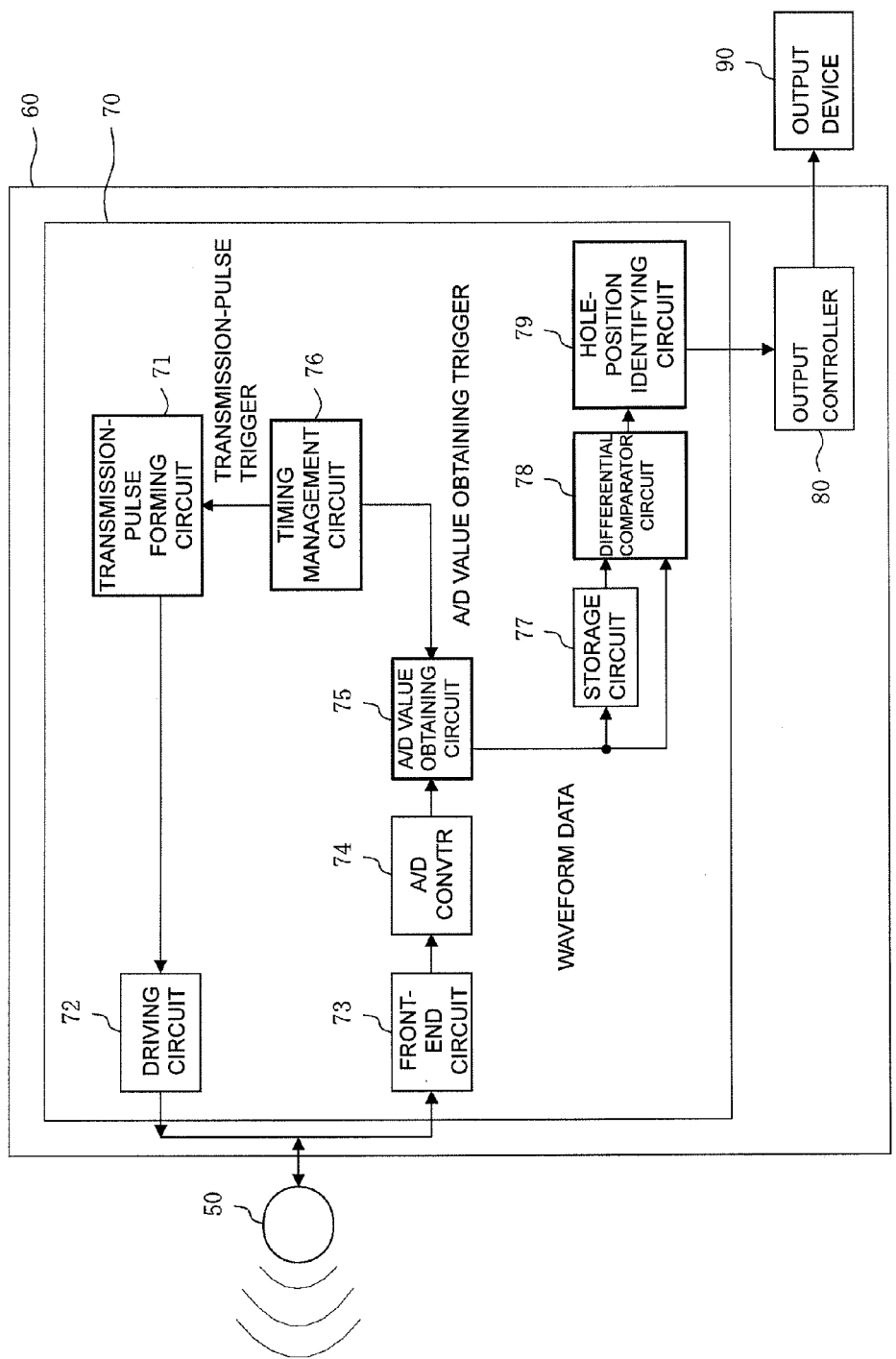
FIG. 3 is a block diagram that illustrates a configuration of a signal processor of the operation-position detecting section.

FIG. 3 is a block diagram that illustrates an example of the configuration of the signal processor 60 shown in FIG. 2(A). The signal processor 60 includes a fundamental operation-position detecting section 70 that detects an operation position of the tube and an output controller 80 that controls outputting in accordance with the detected position and in accordance with the output device 90.

In the operation-position detecting section 70, a front-end circuit 73 performs frequency-filtering on a reception signal of the ultrasonic transmitter-receiver 50 and amplifies it, and an analog-to-digital (A/D) converter 74 converts an output voltage of the front-end circuit 73 from analog to digital form.

A timing management circuit 76 supplies a transmission-pulse trigger to a transmission-pulse forming circuit 71. In response to the transmission-pulse trigger, the transmission-pulse forming circuit 71 generates an ultrasonic burst signal and outputs it to a driving circuit 72.

The timing management circuit 76 outputs an A/D value obtaining trigger signal to an A/D value obtaining circuit 75. The A/D value obtaining circuit 75 controls the A/D converter 74 at the timing of the A/D value obtaining trigger and obtains a digital value thereof.

A storage circuit 77 is a memory for storing information on waveforms in the past for use in comparing reception signals. The storage circuit 77 stores a value obtained by the A/D value obtaining circuit 75. The storage circuit 77 outputs information previously stored to a differential comparator circuit 78.

The differential comparator circuit 78 is a computing circuit that accumulates a difference (absolute value) between a waveform stored in the storage circuit 77 and a waveform output from the A/D value obtaining circuit 75 for each sampling value.

When a result of a computation carried out by the differential comparator circuit 78 exceeds a previously set threshold, a hole-position identifying circuit 79 identifies a hole (that has been closed or opened) that causes a change in a differential signal at that timing.

The output controller 80 performs predetermined processing in accordance with data identified by the hole-position identifying circuit 79 (in the example illustrated in FIG. 2(A), data that indicates an open or closed state of each of the five holes 41a to 41e) and outputs the result to the output device 90. Concrete examples of the control of outputting and the output device are described in different embodiments below.

Figure 4:
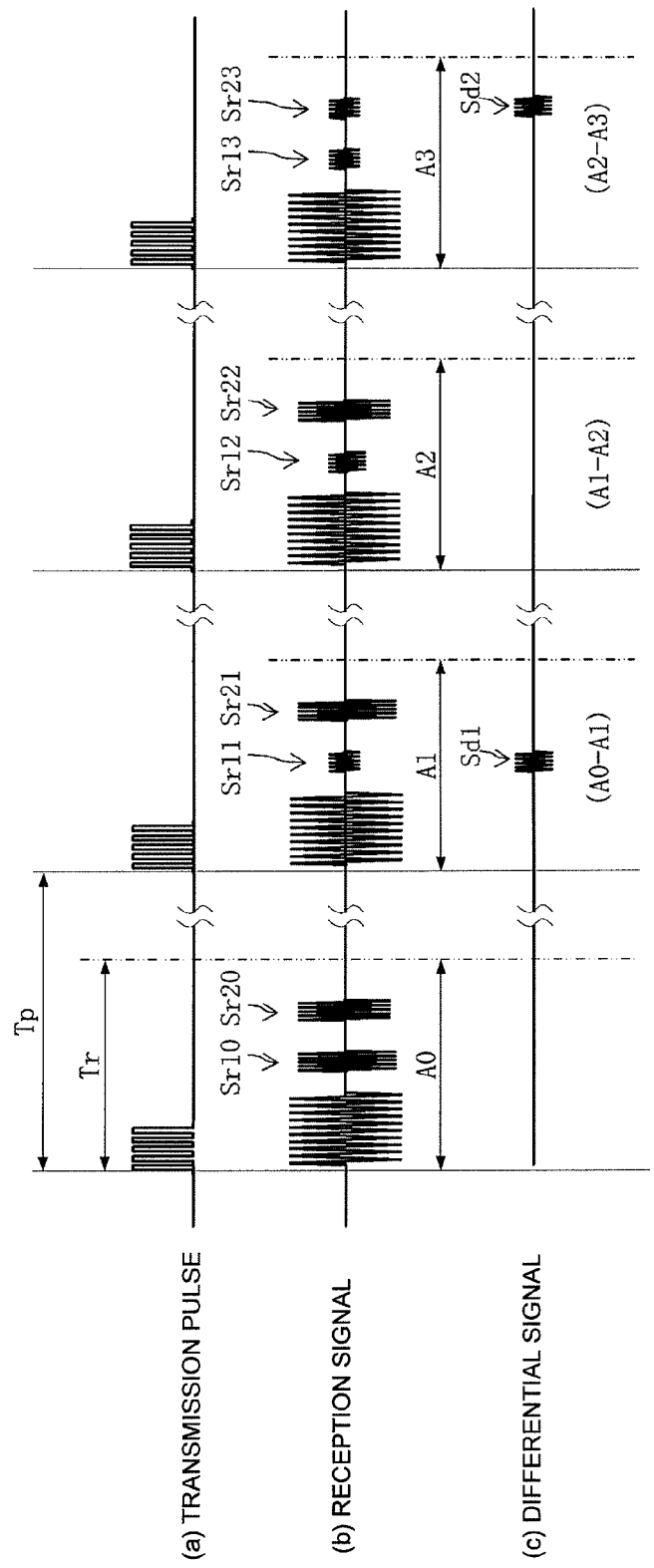
FIG. 4 illustrates waveforms of parts of an operation-position detecting section.

FIG. 4 illustrates a relationship between action of the operation-position detecting section 70 illustrated in FIG. 3 and timing of processing.

In FIG. 4, "transmission pulse" indicates an output signal of the transmission-pulse forming circuit 71 illustrated in FIG. 3, "reception signal" indicates one in which an output value of the A/D converter 74 illustrated in FIG. 3 is represented as a waveform, and "differential signal" indicates one in which a difference in the differential comparator circuit 78 illustrated in FIG. 3 is represented as a waveform.

In this example, for each transmission period Tp (=300 ms), an ultrasonic signal is intermittently transmitted toward a monitoring area. A reception signal of a reflected wave is written in the storage circuit 77 by the amount corresponding to the waveform comparison time Tr (=10 ms).

At the timing of the waveform comparison time A1, the differential comparator circuit 78 determines a difference between a reception signal in the preceding waveform comparison time A0 and a reception signal in the current waveform comparison time A1. At the timing of the waveform comparison time A2, the differential comparator circuit 78 determines a difference between a reception signal in the preceding waveform comparison time A1 and a reception signal in the current waveform comparison time A2. Accordingly, in the example illustrated in FIG. 4, a differential signal illustrated in the drawing occurs in each of the waveform comparison times A1 and A3.

When the strength of the above differential signal is at or above a specific value, the differential comparator circuit 78 identifies a hole (that has been closed or open) that causes a change in differential signal at that timing.

In the example illustrated in FIG. 4, in A1, the strength of a reception signal Sr11 decreases, compared with that of a reception signal Sr10 at the same timing in A0, thus resulting in the occurrence of a differential signal Sd1. This is because an open hole that causes the reception signal Sr10 is closed at the timing of A1, and the strength of a reflection signal thus decreases. The strength of a reception signal Sr23 in A3 decreases, compared with the strength of a reception signal Sr22 at the same timing in A2, thus resulting in the occurrence of a differential signal Sd2. This is because an open hole that causes the reception signal Sr22 is closed at the timing of A3, and the strength of a reflection signal thus decreases.

In such a way, several specific timings at which reflection signals are generated or suppressed basically correspond to the positions of holes by which the reflection signals are generated or suppressed. Accordingly, in response to the timing at which the above differential signal is generated, the position of a hole that undergoes an operation of closing or opening is identified.

It is to be noted that, although the example of FIG. 4 illustrates a reduced number of reflection signals (simplified reflection signals), a signal reflected at the position of an open hole is re-reflected at the position of another open hole (undergoes multiple reflection) in returning to the ultrasonic transmitter-receiver. The strength of a signal of such multiple reflection is low, but the signal of the multiple reflection is superposed on a reception signal.

Thus, in addition to identifying the position of a hole that is closed or opened from timing at which a differential signal is generated when the hole is closed or opened, a close or open state of a hole may be detected by pattern matching with waveforms obtained from previous determination of a relationship between closing of a hole of a plurality of holes and generation of a reflection signal when that hole is closed.

Second Embodiment

FIGS. 5(A) and 5(B) are cross-sectional views that illustrate configurations of a hole-position portion of a tube for use in an operation-position detector according to a second embodiment.

In the example of FIG. 5(A), a cover 42 having a deformable shape and covering the outer-side surrounding area of the hole 41 formed in the tube 40 is disposed. The cover 42 can be made of soft rubber, for example, and allows the hole 41 to be closed by the inner surface of the cover 42 being pressed by the tip of a finger of an operator. The closing of the hole 41 can be returned to the state illustrated in FIG. 5(A) by release of the tip of a finger. Accordingly, deformation of the cover 42 changes the acoustic feature impedance in the vicinity of the hole 41, an ultrasonic signal passes through the inside of the tube virtually without being reflected in the state where the cover 42 closes the hole 41; and a ultrasonic signal is reflected at the hole 41 portion in the state where the cover 42 remains raised, as illustrated in FIG. 5(A).

The provision of the cover 42 to the outer side of the hole 41 can prevent dust from entering the inside of the tube through the hole and can also prevent entry of outside airflow. Therefore, stability of detection of an operation position can be enhanced.

In the example of FIG. 5(B), an opening and closing member 43 and a coil spring 44 are attached to the hole 41 formed in the tube 40. In the state illustrated in FIG. 5(B), the coil spring 44 acts to upwardly press the opening and closing member 43 toward the direction of the outside of the tube 40, so the hole 41 is in a closed state. When an operator presses the opening and closing member 43 down with the tip of his or her finger in this state, the lower portion S of the opening and closing member 43 is opened and the acoustic feature impedance in the vicinity of the hole changes.

In such a way, the hole is normally in a closed state, and the hole can be brought into an open state by downward pressing.

Third Embodiment

FIG. 6 illustrates a configuration of an electronic instrument that includes an operation-position detector according to a third embodiment. The configuration in the third embodiment is substantially the same as that in the first embodiment in the points that the tube 40 has the holes 41a to 41e at its side and is provided with the ultrasonic transmitter-receiver 50 at its end. The signal processor 60 also has substantially the same configuration as that illustrated in FIG. 3.

In the third embodiment, a speaker 91 is included as the output device. The signal processor 60 outputs a sound of a specific scale depending on the state of each of the holes 41a to 41e being closed or opened by an operation of an operator.

This enables the third embodiment to act as an electronic instrument capable of being played by an operation of closing any of the holes 41a to 41e.

Fourth Embodiment

Figure 7:
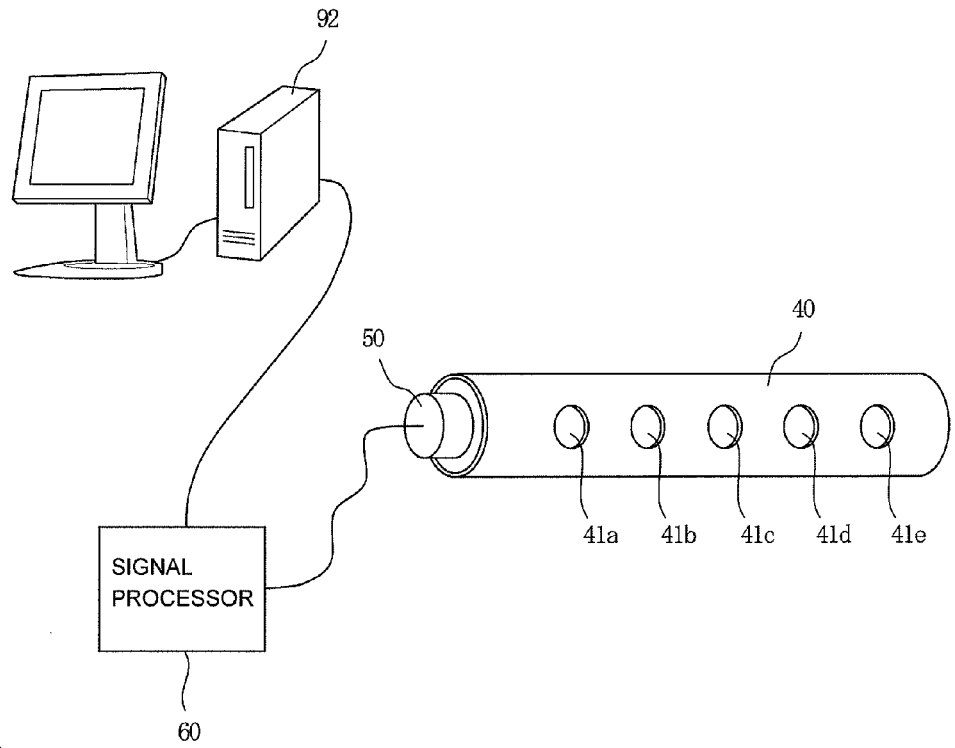
FIG. 7 illustrates a configuration of an operation-position detector and an input device being an application thereof according to a fourth embodiment.

FIG. 7 illustrates a configuration of an input device that includes an operation-position detector according to a fourth embodiment. The configuration in the fourth embodiment is substantially the same as that in the first embodiment in the points that the tube 40 has the holes 41a to 41e at its side and is provided with the ultrasonic transmitter-receiver 50 at its end. The signal processor 60 also has substantially the same configuration as that illustrated in FIG. 3.

In this example, a personal computer 92 is included as the output device. The signal processor 60 generates a key code associated with a closed hole of the holes 41a to 41e and displays a character, symbol, and the like corresponding to the key code on a display device.

Fifth Embodiment

Figure 8:
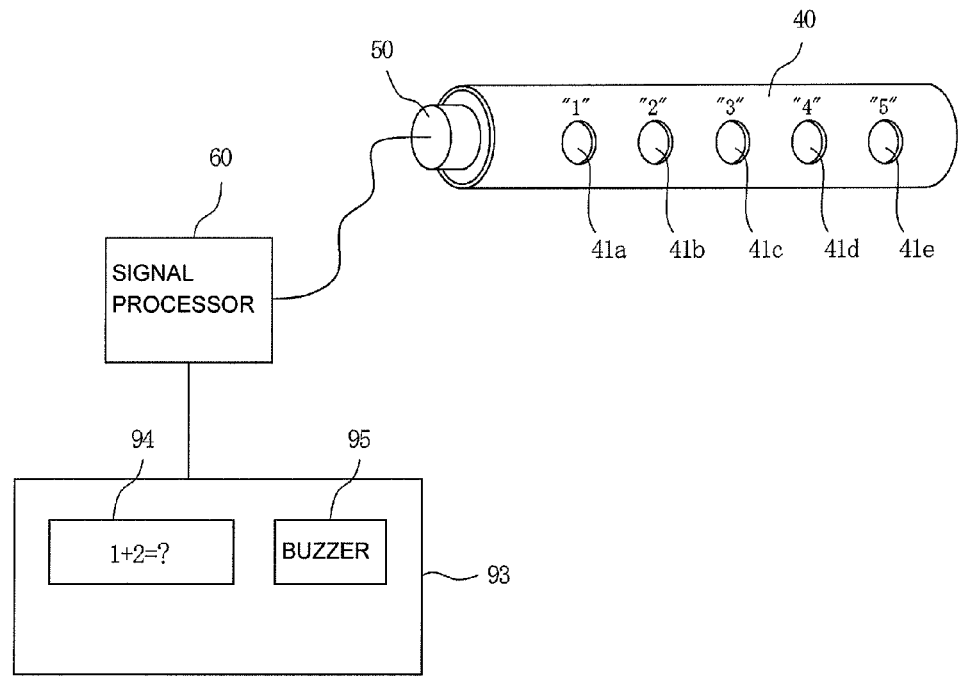
FIG. 8 illustrates a configuration of an operation-position detector and a game device being an application thereof according to a fifth embodiment.

FIG. 8 illustrates a configuration of a game device that includes an operation-position detector according to a fifth embodiment. The configuration in the fifth embodiment is substantially the same as that in the first embodiment in the points that the tube 40 has the holes 41a to 41e at its side and is provided with the ultrasonic transmitter-receiver 50 at its end. The signal processor 60 also has substantially the same configuration as that illustrated in FIG. 3. However, in this example, the tube 40 has the holes 41a to 41e at its side, and numeric characters corresponding to the respective holes are provided in the vicinity of the holes.

In this example, an output device 93 includes a display section 94 and a buzzer 95. The signal processor 60 performs, on the output device 93, processing for displaying specific indication on the display section 94 and processing for driving the buzzer 95.

Figure 9:
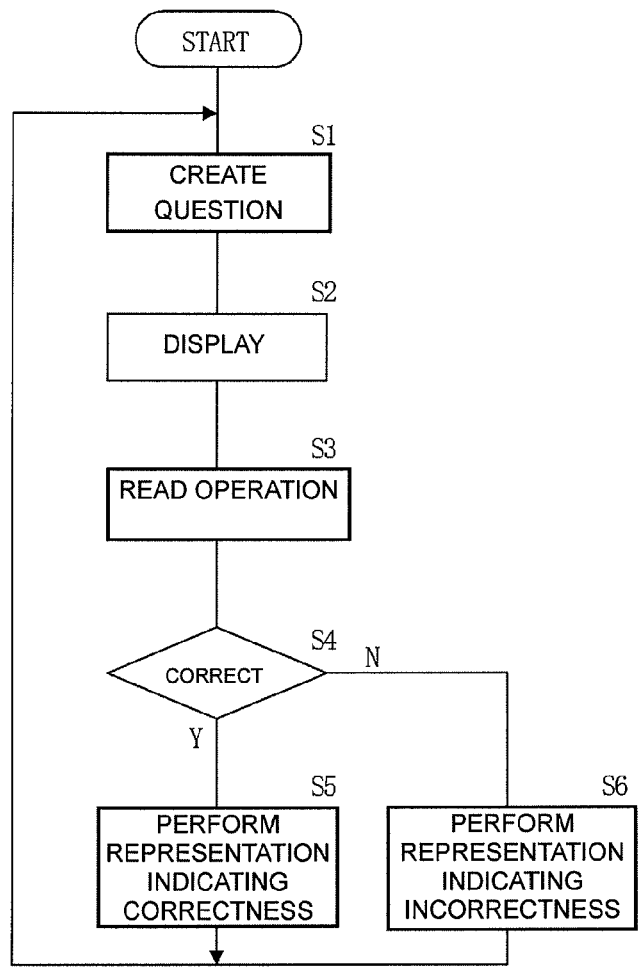
FIG. 9 illustrates a procedure of an output device of the application.

FIG. 9 is a flowchart that illustrates the details of processing of the output device 93 illustrated in FIG. 8. When receiving data indicating a hole that has been closed from the signal processor 60, the output device 93 performs the processing in the procedure illustrated in FIG. 9. That is, the output device 93 first creates a question to be displayed on the display section 94 on a random basis and displays it (S1 to S2). After a wait for an operation of an operator, when a hole is closed by the operation, the output device 93 receives a key code corresponding to that hole from the signal processor 60 and determines whether it is correct or not (S3 to S4). When it is correct, the output device 93 drives the buzzer 95 using a pattern for a correct answer and performs representation indicating correctness (S5). When it is incorrect, the output device 93 drives the buzzer 95 using a pattern for an incorrect answer and performs representation indicating incorrectness (S6).

Sixth Embodiment

Figure 10:
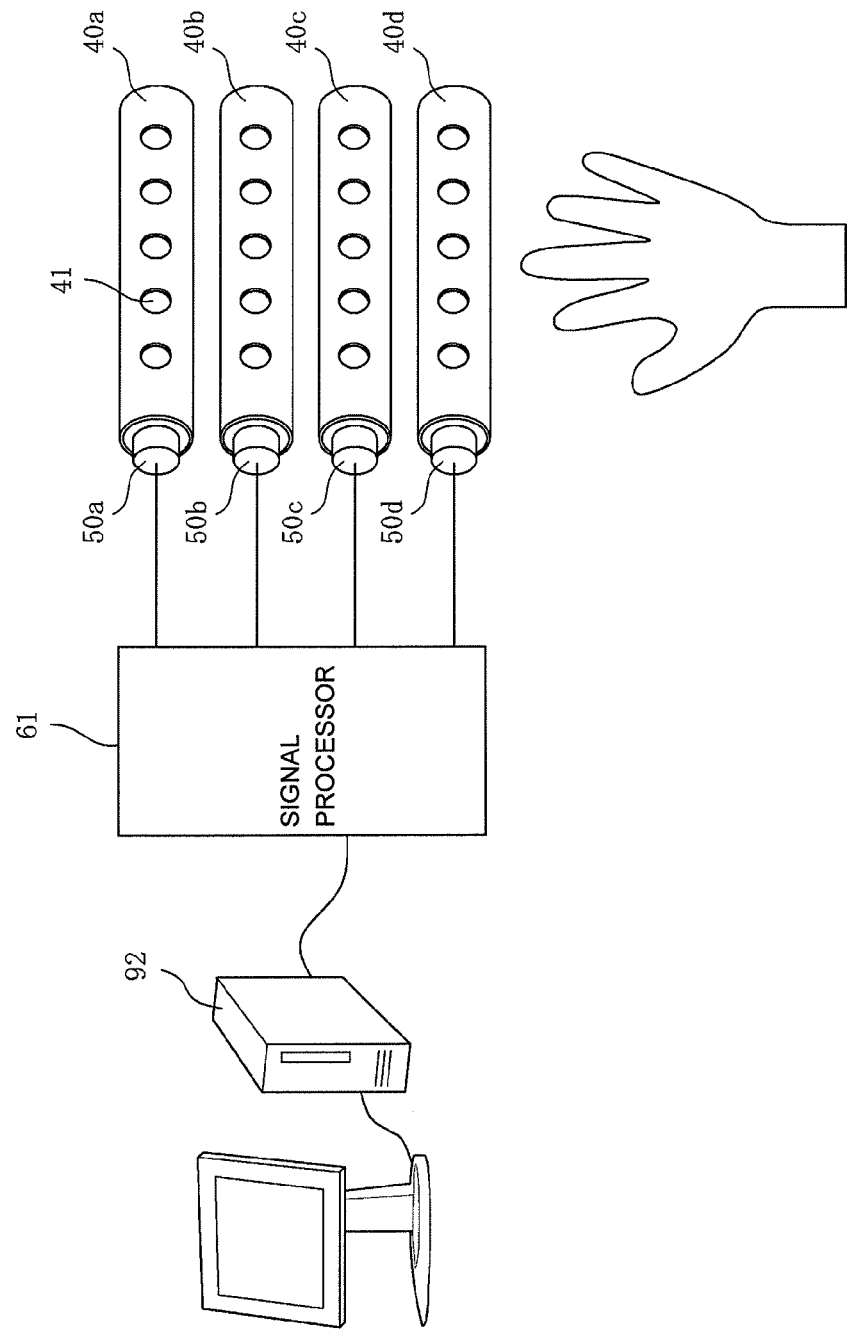
FIG. 10 illustrates a configuration of an operation-position detector and a keyboard being an application thereof according to a sixth embodiment.

FIG. 10 illustrates a configuration of a keyboard that includes an operation-position detector according to a sixth embodiment. It includes a plurality of tubes 40a to 40d at locations corresponding to an operating portion of the keyboard to be operated by an operator. Each tube has a plurality of holes 41 at its side. Ultrasonic transmitter-receivers 50a to 50d are arranged at first ends of the tubes 40a to 40d, respectively.

A signal processor 61 has the same number of operation-position detecting sections 70 as the number of the tubes 40a to 40d. The signal processor 61 drives the plurality of ultrasonic transmitter-receivers 50a to 50d and receives a reception signal. Accordingly, the signal processor 61 detects an operation state of each of the many holes 41 formed in the tubes 40a to 40d and outputs an associated key code to the personal computer 92. The signal processor 61 can be viewed as a typical keyboard from the personal computer 92, so the personal computer 92 performs processing corresponding to a typical keyboard operation.

Seventh Embodiment

Figure 11:
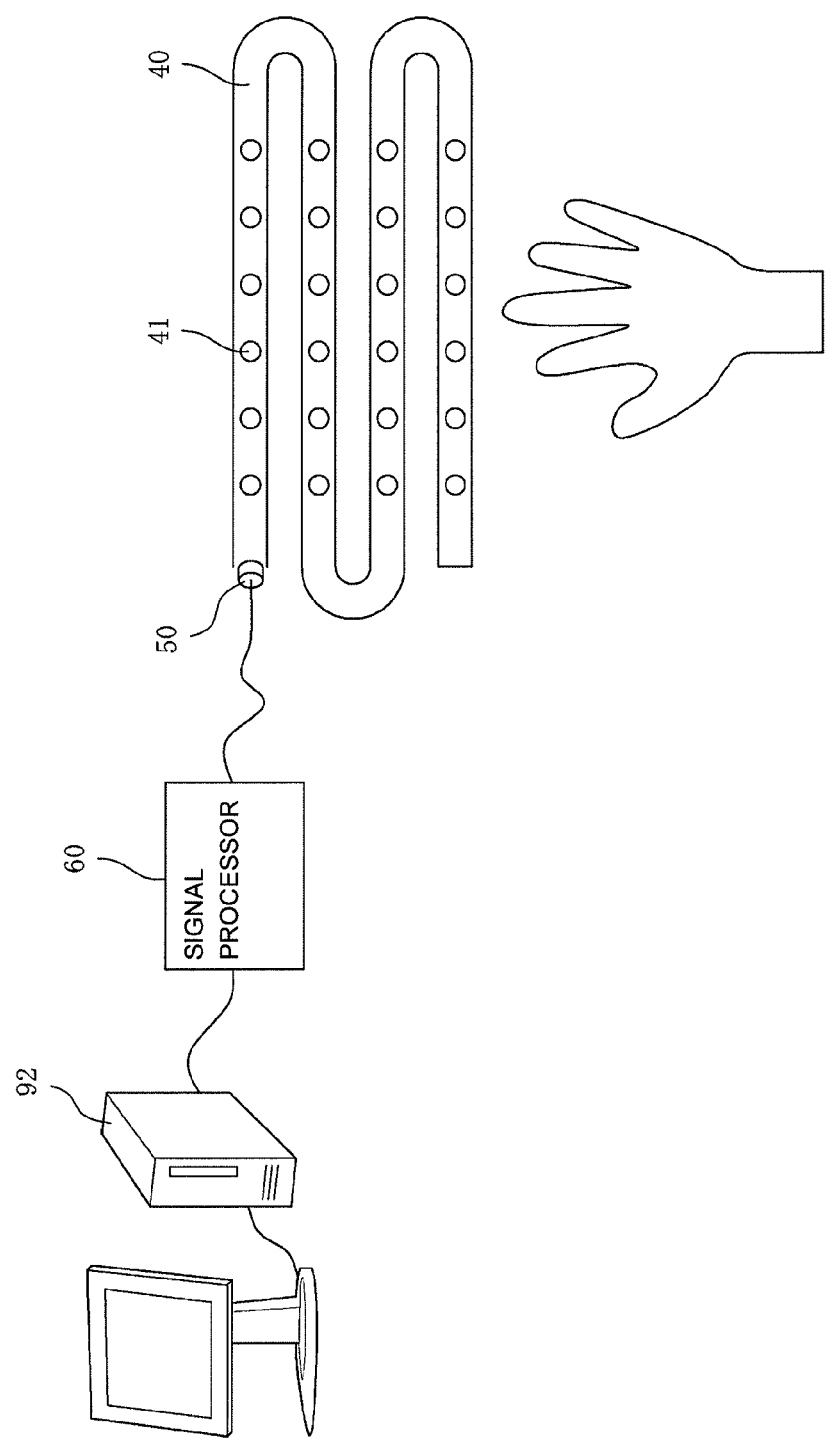
FIG. 11 illustrates a configuration of an operation-position detector and a keyboard being an application thereof according to a seventh embodiment.

FIG. 11 illustrates a configuration of a keyboard that includes an operation-position detector according to a seventh embodiment. It includes the tube 40 at a location corresponding to an operating portion of the keyboard to be operated by an operator. The tube has the holes 41 at its side. The ultrasonic transmitter-receiver 50 is arranged at a first end of the tube 40.

In this example, the tube 40 is bent in U shapes in part and in a zigzag as a whole and has the plurality of holes 41 along the tube at its side.

Even with such a shape, the propagation distance of an ultrasonic wave propagating through the inside of the tube 40 is determined along the tube 40, so the signal processor 60 can perform processing as in the case of the tube 40 being a straight tube.

In such a way, even with the single ultrasonic transmitter-receiver 50, the plurality of holes can be arranged lengthwise and crosswise.

Eighth Embodiment

Figure 12:
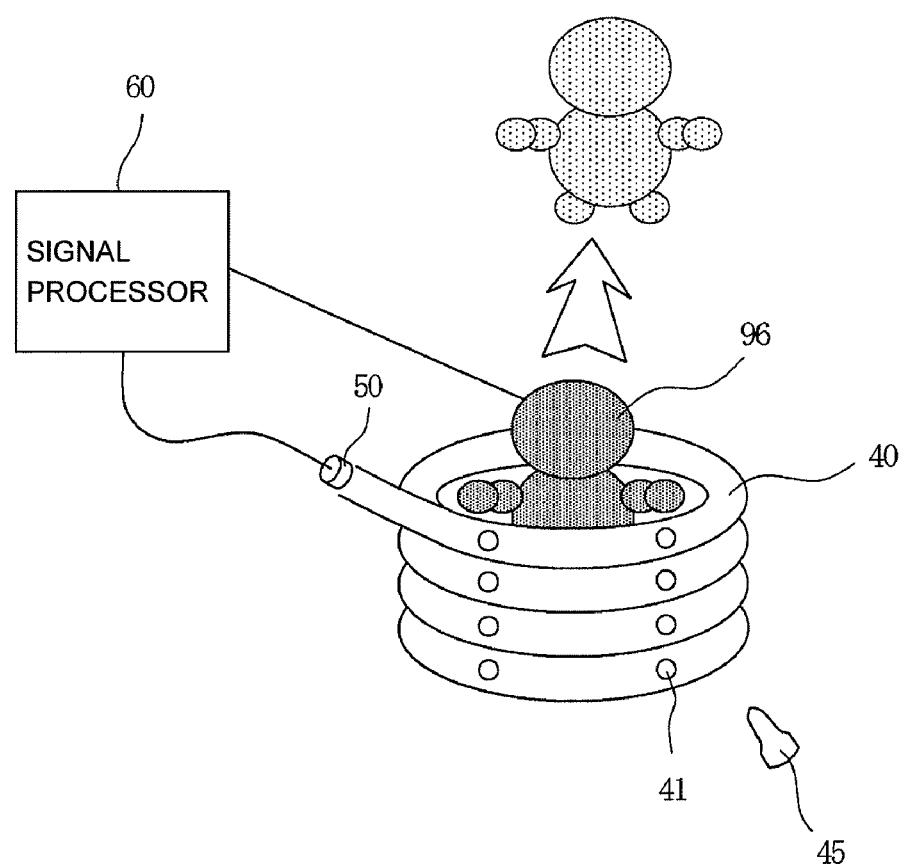
FIG. 12 illustrates a configuration of an operation-position detector and an electronic toy being an application thereof according to an eighth embodiment.

FIG. 12 illustrates a configuration of an electronic toy that includes an operation-position detector according to an eighth embodiment. The electronic toy is a game that is set such that the tube 40 having a spiral shape is likened to a barrel and an insertion bar (short sword) 45 is inserted in order to save a doll (pirate) projecting from the upper surface of the barrel by cutting a rope within the barrel until the doll (pirate) is helped out.

In this example, the tube 40 is formed in a spiral shape, has the plurality of holes 41 at its side, and is provided with the ultrasonic transmitter-receiver 50 at a first end thereof. A second end of the tube 40 may be an open end or a closed end. A representation member 96 having a doll shape is arranged in the central portion of the spiral tube 40, and a compression coil spring is engaged to an engagement portion in a compressed state. A device (solenoid) for releasing the engagement portion is the output device of the signal processor 60.

The signal processor 60 drives the solenoid to release the engagement portion and cause the representation member 96 to jump up.

An operator inserts the insertion bar 45 into a specific hole of the plurality of holes 41 to close the hole. The signal processor 60 identifies the closed hole, and when detecting that a predetermined specific hole is closed, the signal processor 60 causes the representation member 96 to jump up by driving the solenoid.

In the embodiments illustrated above, the ultrasonic transmitter-receiver shared in transmission and reception is disposed as an ultrasonic transducer. However, if the overall length of the tube is short, an ultrasonic transmitter and an ultrasonic receiver may be disposed independently.

Ninth Embodiment

Figure 13:
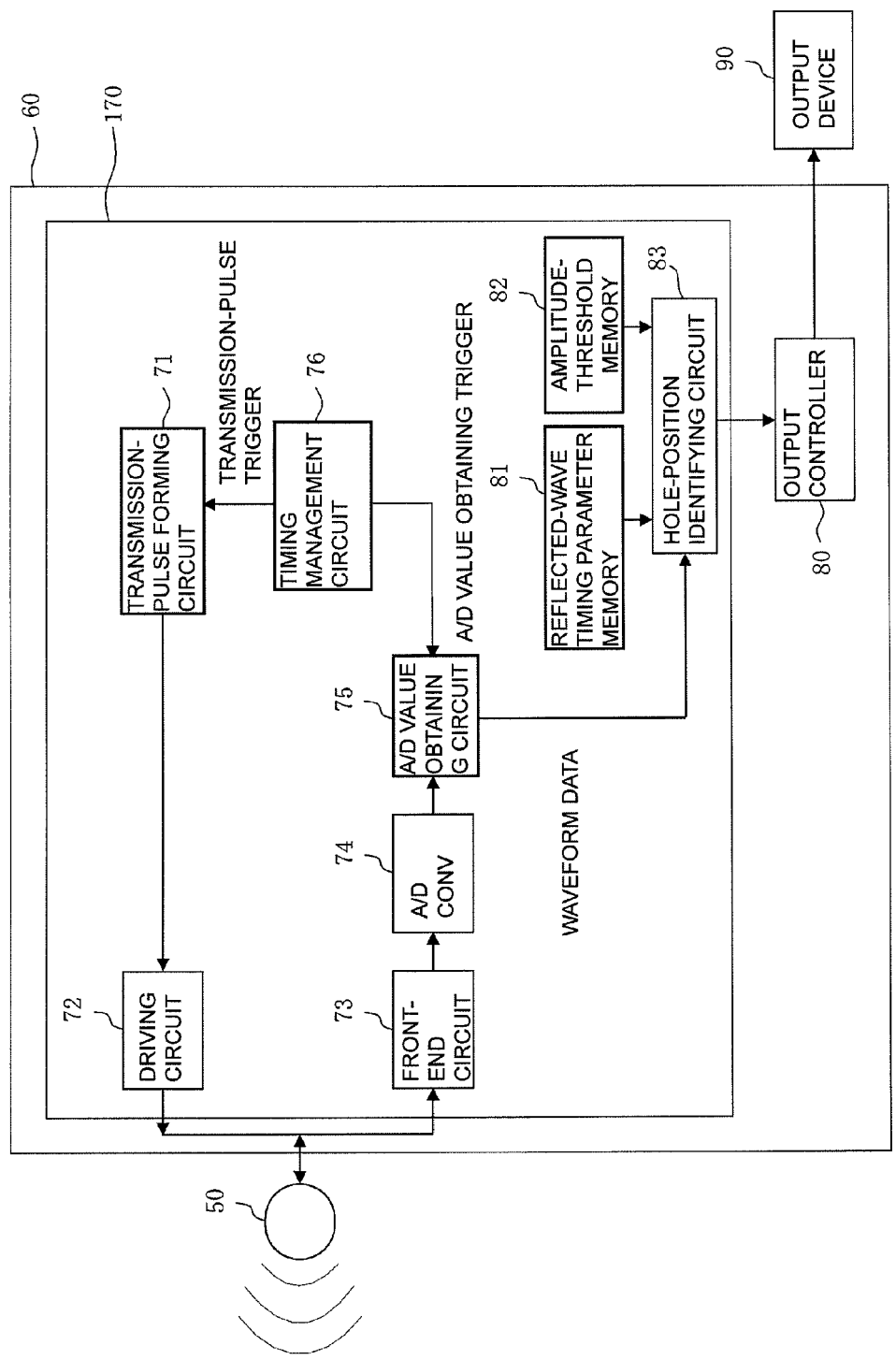
FIG. 13 is a block diagram of a signal processor of an operation-position detector and an application thereof according to a ninth embodiment.

FIG. 13 is a block diagram of the signal processor 60 of an operation-position detector and an application thereof according to a ninth embodiment. The signal processor 60 includes a fundamental operation-position detecting section 170 that detects an operation position of the tube and the output controller 80 that controls outputting in accordance with the detected position and in accordance with the output device 90. The configuration of each of the ultrasonic transmitter-receiver 50 and the output device 90 is substantially the same as that in the embodiments previously illustrated.

In the operation-position detecting section 170, the front-end circuit 73 performs frequency-filtering on a reception signal of the ultrasonic transmitter-receiver 50 and amplifies it, and the A/D converter 74 converts an output voltage of the front-end circuit 73 from analog to digital form.

The timing management circuit 76 supplies a transmission-pulse trigger to the transmission-pulse forming circuit 71. In response to the transmission-pulse trigger, the transmission-pulse forming circuit 71 generates an ultrasonic burst signal and outputs it to the driving circuit 72.

The timing management circuit 76 outputs an A/D value obtaining trigger signal to the A/D value obtaining circuit 75. The A/D value obtaining circuit 75 controls the A/D converter 74 at the timing of the A/D value obtaining trigger and obtains a digital value thereof.

A reflected-wave timing parameter memory 81 is a memory that stores information about timing (reception timing) at which an amplitude of a reception signal is to be detected. An amplitude-threshold memory 82 is a memory that stores a threshold for use in determining the presence or absence of a reflected wave at each timing of a reception signal. A hole-position identifying circuit 83 outputs data on a waveform of a reception signal, detects an amplitude at each timing determined in the reflected-wave timing parameter memory 81, and also determines whether the amplitude is significant or not (that is, the presence or absence of a reflected wave) by comparing the amplitude with a value in the amplitude-threshold memory 82. As describe below, the hole-position identifying circuit 83 identifies a closed or open state of a hole that is a target of the determination by the use of a pattern for the presence or absence of a reflected wave at each timing determined in advance for each hole being a target for the determination.

The output controller 80 performs predetermined processing in accordance with data identified by the hole-position identifying circuit 83 and outputs the result to the output device 90.

Figure 14A:
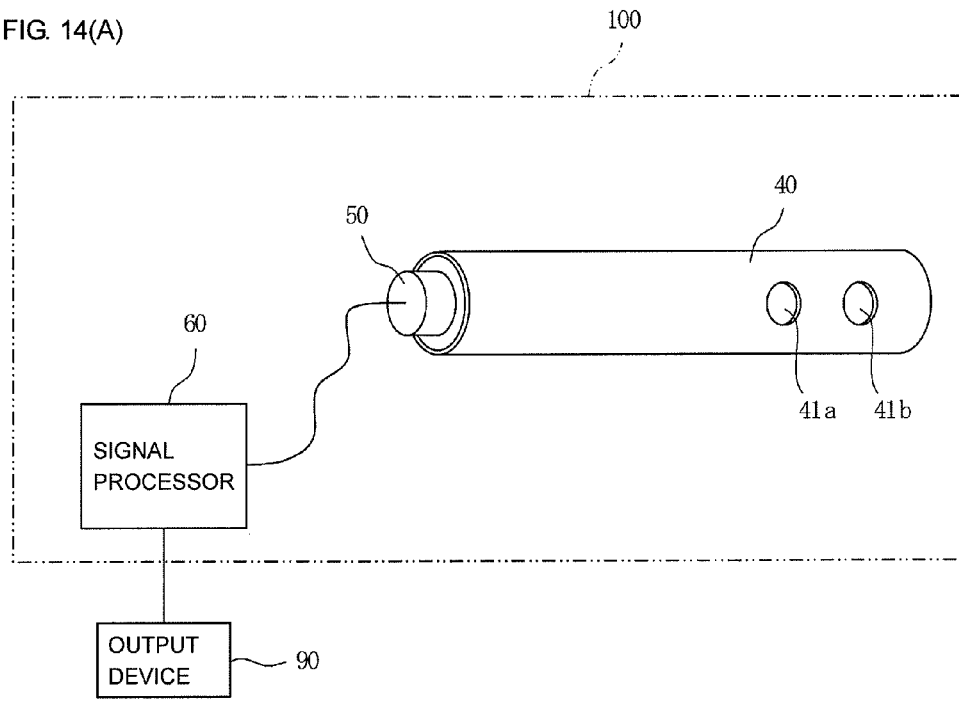
FIG. 14(A) illustrates a configuration of the operation-position detector and FIG. 14(B) illustrates the application thereof according to the ninth embodiment.
Figure 14B:
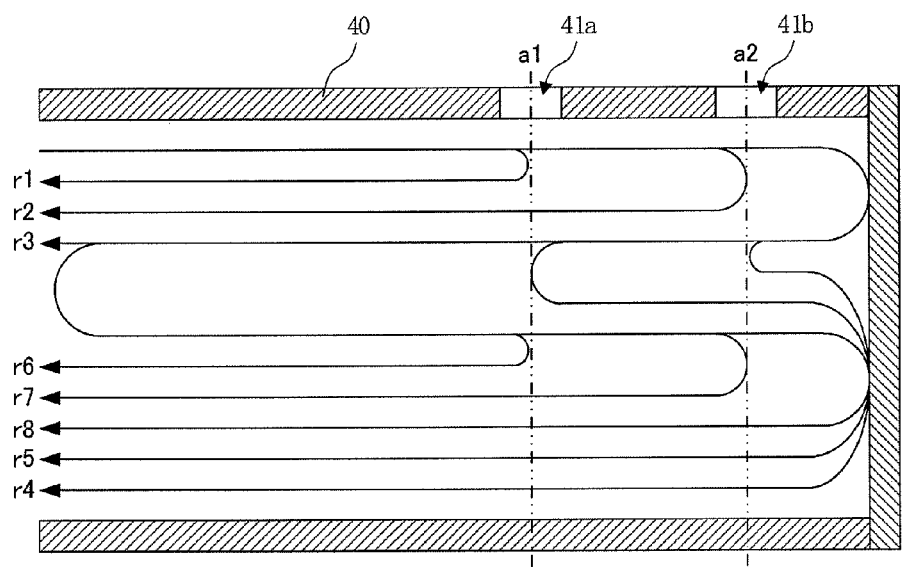

FIGS. 14(A) and 14(B) illustrate a configuration of an operation-position detector and an application thereof according to the ninth embodiment. In FIG. 14(A), the operation-position detector 100 includes the tube 40 having the holes 41*a* and 41*b* at its side and the ultrasonic transmitter-receiver 50 arranged at an end of the tube 40. The ultrasonic transmitter-receiver 50 is connected to the signal processor 60. In such a way, the tube 40, which has the plurality of holes and is provided with the ultrasonic transmitter-receiver 50 at its end, and the signal processor 60 form the operation-position detector 100.

FIG. 14(B) is a cross-sectional view that illustrates routes of an ultrasonic wave that propagates through and is reflected in the inside of the tube 40 illustrated in FIG. 14(A). The tube 40 is a cylindrical tube that has the holes 41*a* and 41*b* along its longitudinal direction. The left end of the tube 40 is closed by the attachment of the ultrasonic transmitter-receiver 50 thereto. The right end thereof is also closed by a wall.

An ultrasonic wave is reflected at the closed ends and the position of an open hole of the tube 40, so propagation of an ultrasonic wave occurs along routes r1 to r8 illustrated in the drawing in accordance with a closed or open state of each of the holes 41*a* and 41*b*. Of course, other reflection also occurs, but the amplitude of its reflected wave is so small that it is negligible. That reflected wave is negligible also because it is received after a time lag from a specified time.

Figure 15A:
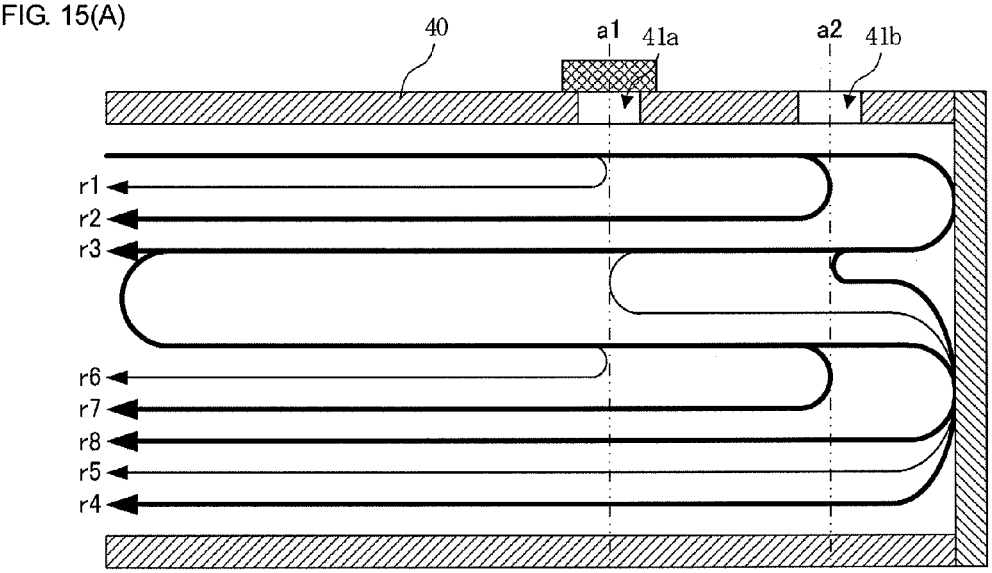
FIGS. 15(A) and 15(B) illustrate routes of an ultrasonic wave in a state where either one of holes 41a and 41b is closed by, for example, a finger.
Figure 15B:
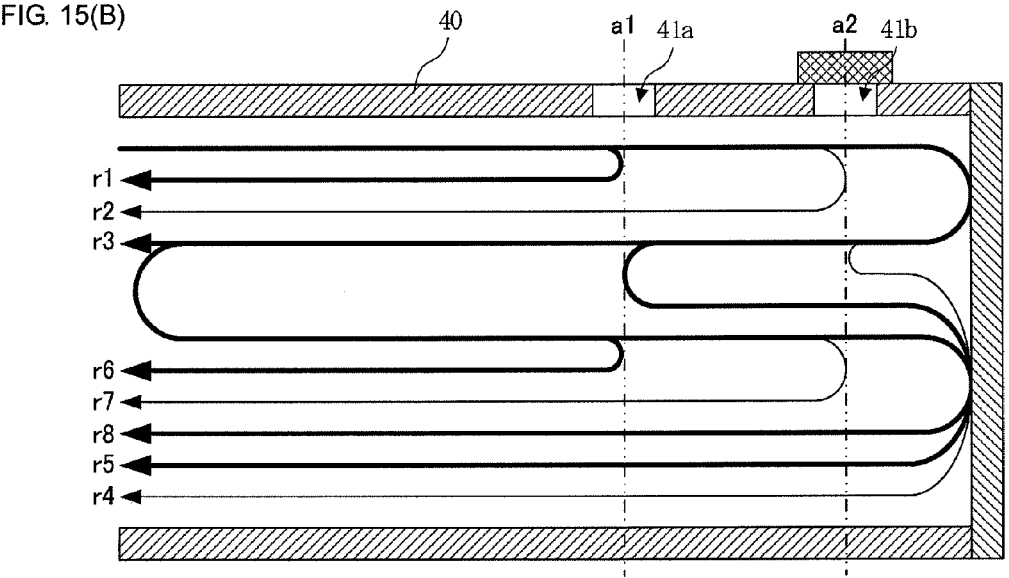

FIG. 15(A) illustrates routes of an ultrasonic wave in a state where the hole 41*a* is closed by, for example, a finger. FIG. 15(B) illustrates routes of an ultrasonic wave in a state where the hole 41*b* is closed by, for example, a finger.

As illustrated in FIG. 15(A), in a state where the hole 41*a* is closed by, for example, a finger, no reflection of the ultrasonic wave occurs in the position a1 of the hole 41*a*, so propagation of the ultrasonic wave occurs along the routes r2, r3, r4, r7, and r8, as indicated by the thick lines in the drawing. As illustrated in FIG. 15(B), in a state where the hole 41*b* is closed by, for example, a finger, no reflection of the ultrasonic wave occurs in the position a2 of the hole 41*b*, so propagation occurs along the routes r1, r3, r5, r6, and r8, as indicated by the thick lines in the drawing.

FIG. 16 illustrates a relationship between action of the operation-position detecting section 170 illustrated in FIG. 13 and timing of processing. In the drawing, the term Tp is a transmission period, and the term Ts is a term for use in pattern determination.

In FIGS. 16 and 17, "transmission pulse" indicates an output signal of the transmission-pulse forming circuit 71 illustrated in FIG. 13, and. "reception signal" indicates one in which an output value of the A/D converter 74 illustrated in FIG. 13 is represented as a waveform.

As indicated as the reception signal (b) in FIG. 16, in a state where the holes 41a and 41b are open, a reflected wave occurs at reception timings of an ultrasonic wave following the routes r1 to r8 illustrated in FIG. 14(B).

As indicated as the reception signal (c) in FIG. 16, when the hole 41a is in a closed state and the hole 41b is in an open state, a reflected wave occurs at reception timings of an ultrasonic wave following the routes r2, r3, r4, r7, and r8 illustrated in FIG. 15(A).

As indicated as the reception signal (c) in FIG. 17, when the hole 41a in an open state and the hole 41b is in a closed state, a reflected wave occurs at reception timings of an ultrasonic wave following the routes r1, r3, r5, r6, and r8 illustrated in FIG. 15(B).

In such a way, a pattern of the occurrence of a reflected wave associated with a closed or open state of each hole is determined. The hole-position identifying circuit 83 illustrated in FIG. 13 identifies which hole is in an open state by the use of the above pattern.

In the examples of FIGS. 16 and 17, a reflected wave from the route r8 always occurs, so information on the reflected wave from the route r8 is not used.

The above examples illustrate the cases where either one of the two holes 41a and 41b is in a closed state or both are in an open state. Also when both holes are in a closed state, because a further different reflected wave occurs, the state can be identified in a similar manner. Moreover, also when there are three or more holes, because different reflected waves occur depending on a closed or open state of each hole, the state can be identified in a similar manner.

The terminal of the tube may be an open end. Because reflection of an ultrasonic wave occurs at that open end, a closed or open state of each hole can be identified in a similar manner. However, because the reflectivity for a closed end is higher than that for an open end, it is preferable that the terminal be a closed end when reflection at the end is utilized, as in the case of this ninth embodiment.

Tenth Embodiment

Figure 18A:
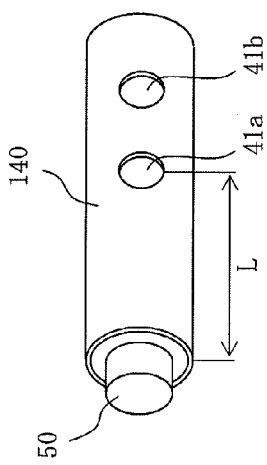
FIG. 18(A) illustrates an example of a structure of a tube for use in an operation-position detector and FIG. 18(B) illustrates an example of a reflected wave according to a tenth embodiment.
Figure 18B:
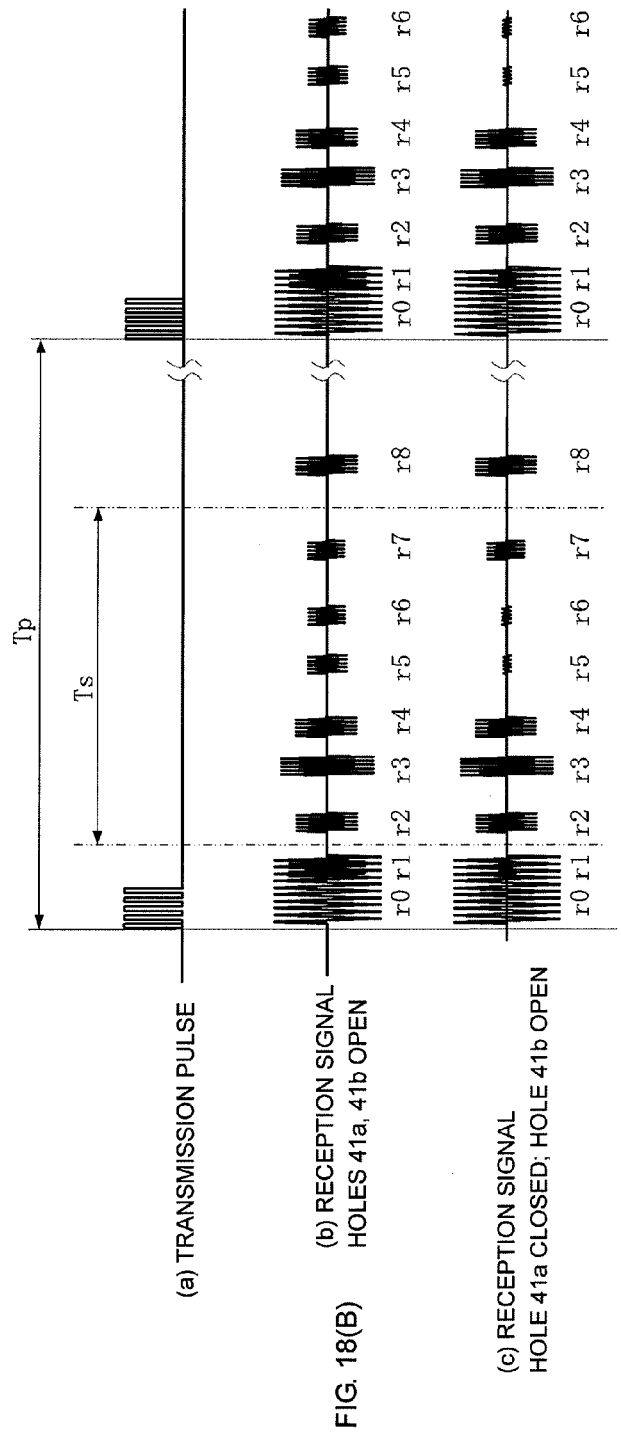

FIG. 18(A) illustrates a configuration of a tube 140 for use in an operation-position detector according to a tenth embodiment. FIG. 18(B) illustrates a relationship between action of an operation-position detecting section that uses the tube 140 illustrated in FIG. 18(A) and timing of processing.

The distance L from the ultrasonic transmitter-receiver 50 to the hole 41a at the nearest position is shorter than that in the tube 40 illustrated in the ninth embodiment. The distance L is shorter than the propagation distance of an ultrasonic wave in a time corresponding to a reverberation time of the ultrasonic transmitter-receiver 50. The other configuration is substantially the same as that in the ninth embodiment.

As is clear from comparison between FIG. 16 and FIG. 18(B), among reception signals, a reflected wave from the route r1 overlaps a reverberation time of the ultrasonic transmitter-receiver 50, so it does not appear as a reflected wave. Because of this, pattern determination is performed on reflected waves from the routes r2 to r7. Although the presence or absence of a reflected wave from the route r1 is omitted together with information, pattern determination is possible using information on many other routes.

Accordingly, a tube that has a short distance L from the ultrasonic transmitter-receiver 50 to the hole 41a at the nearest position can also be utilized.

The invention claimed is:

1. An operation-position detector comprising:
a tube having a plurality of holes disposed along a side thereof, the plurality of holes capable of being selectively closed or opened;
an ultrasonic transmitter-receiver arranged at an end of the tube and configured to transmit an ultrasonic wave and receive an ultrasonic reflection signal that propagates through the tube and is reflected in the tube to obtain a reception signal; and
ultrasonic-signal processor that drives the ultrasonic transmitted-receiver to transmit the ultrasonic wave and detects an open or closed position of at least one of the plurality of holes on the basis of the reception signal,
wherein each of the plurality of holes is provided with a deformable cover.

2. The operation-position detector according to claim 1, wherein the ultrasonic transmitter-receiver is a transducer.

3. The operation-position detector according to claim 1, further comprising:
a plurality of tubes; and
a respective ultrasonic transmitter-receiver arranged in each of the plurality of tubes,
wherein the ultrasonic-signal processor drives the respective ultrasonic transmitter-receivers to transmit and receive a respective ultrasonic signal, and detects the open or closed position of the holes in the plurality of tubes.

4. The operation-position detector according to claim 1, wherein the tube is in one of a U-shape or zigzag-shape, and the holes are arranged lengthwise and crosswise across the tube.

5. The operation-position detector according to claim 1, wherein the tube is shaped helically or spirally.

6. The operation-position detector according to claim 1, wherein deformation of the cover changes an acoustic feature impedance in the vicinity of the hole corresponding thereto.

7. An operation-position detector application comprising:
an operation-position detector comprising:
a tube having a plurality of holes disposed along a side thereof, the plurality of holes capable of being selectively closed or opened;
an ultrasonic transmitter-receiver arranged at an end of the tube and configured to transmit an ultrasonic wave and receive an ultrasonic reflection signal that propagates through the tube and is reflected in the tube to obtain a reception signal; and
ultrasonic-signal processor that drives the ultrasonic transmitted-receiver to transmit the ultrasonic wave and detects an open or closed position of at least one of the plurality of holes on the basis of the reception signal; and
means for generating a sound of a scale associated with the hole in accordance with the detected position of the hole.

8. The operation-position detector application according to claim 7, wherein the means includes a speaker.

9. An operation-position detector application comprising:
an operation-position detector comprising:
a tube having a plurality of holes disposed along a side thereof, the plurality of holes capable of being selectively closed or opened;
an ultrasonic transmitter-receiver arranged at an end of the tube and configured to transmit an ultrasonic wave and receive an ultrasonic reflection signal that propagates through the tube and is reflected in the tube to obtain a reception signal; and ultrasonic-signal processor that drives the ultrasonic transmitted-receiver to transmit the ultrasonic wave and detects an open or closed position of at least one of the plurality of holes on the basis of the reception signal; and means for generating a key code associated with the hole in accordance with the detected position of the hole.

10. The operation-position detector application according to claim 9, wherein the means includes a computer having a display for displaying a character or symbol corresponding to the key code.

11. An operation-position detector application comprising:
an operation-position detector comprising:
a tube having a plurality of holes disposed along a side thereof, the plurality of holes capable of being selectively closed or opened;
an ultrasonic transmitter-receiver arranged at an end of the tube and configured to transmit an ultrasonic wave and receive an ultrasonic reflection signal that propagates through the tube and is reflected in the tube to obtain a reception signal; and
ultrasonic-signal processor that drives the ultrasonic transmitted-receiver to transmit the ultrasonic wave and detects an open or closed position of at least one of the plurality of holes on the basis of the reception signal; and means for producing representation output that indicates correctness or incorrectness associated with the hole in accordance with the detected position of the hole.

12. The operation-position detector application according to claim 11, wherein the means includes a display and a buzzer.

* * * * *

UNITED STATES PATENT AND TRADEMARK OFFICE
CERTIFICATE OF CORRECTION

PATENT NO. : 8,375,794 B2
APPLICATION NO. : 12/776659
DATED : February 19, 2013
INVENTOR(S) : Yuki Maeda et al.

It is certified that error appears in the above-identified patent and that said Letters Patent is hereby corrected as shown below:

Title Page

Item (63), Related U.S. Application Data section:

\*\* Delete "May 11, 2008" and add "November 5, 2008" \*\*

Signed and Sealed this
Twenty-fifth Day of June, 2013

Teresa Stanek Rea
*Acting Director of the United States Patent and Trademark Office*